Nov. 25, 1969 R. BOGGILD 3,480,731
TELEPHONE ANSWERING APPARATUS WITH SELECTOR AND CONTROL
CAMS ON A COMMON SHAFT
Filed Aug. 15, 1966 7 Sheets-Sheet 1
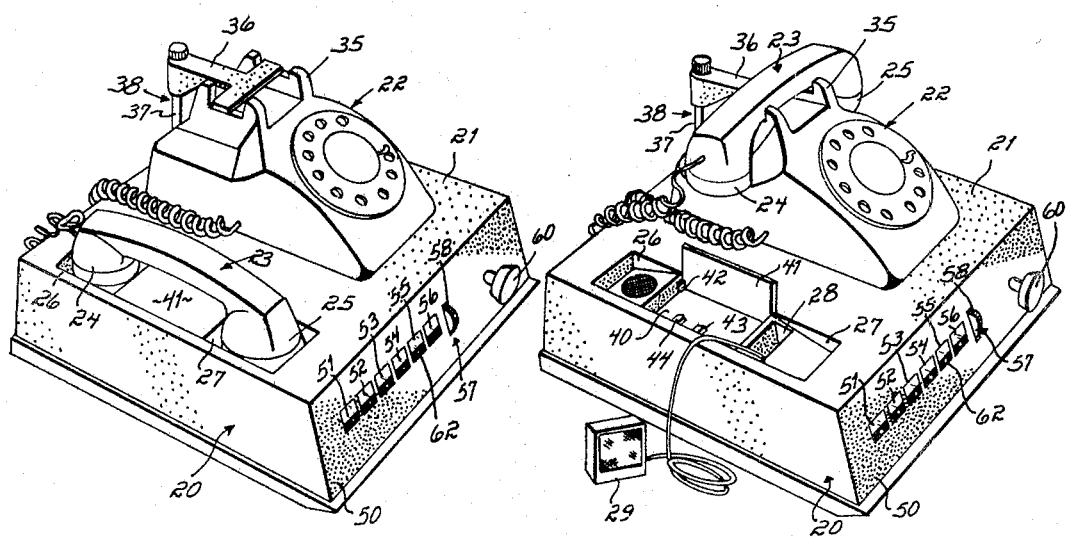
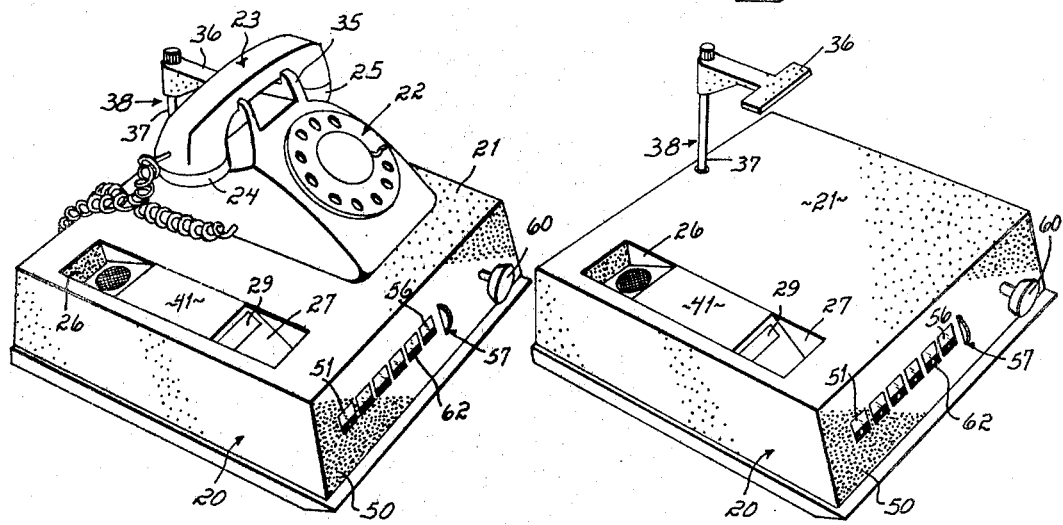
INVENTOR
Robert Boggild
BY
Wood, Herron & Evans
ATTORNEYS

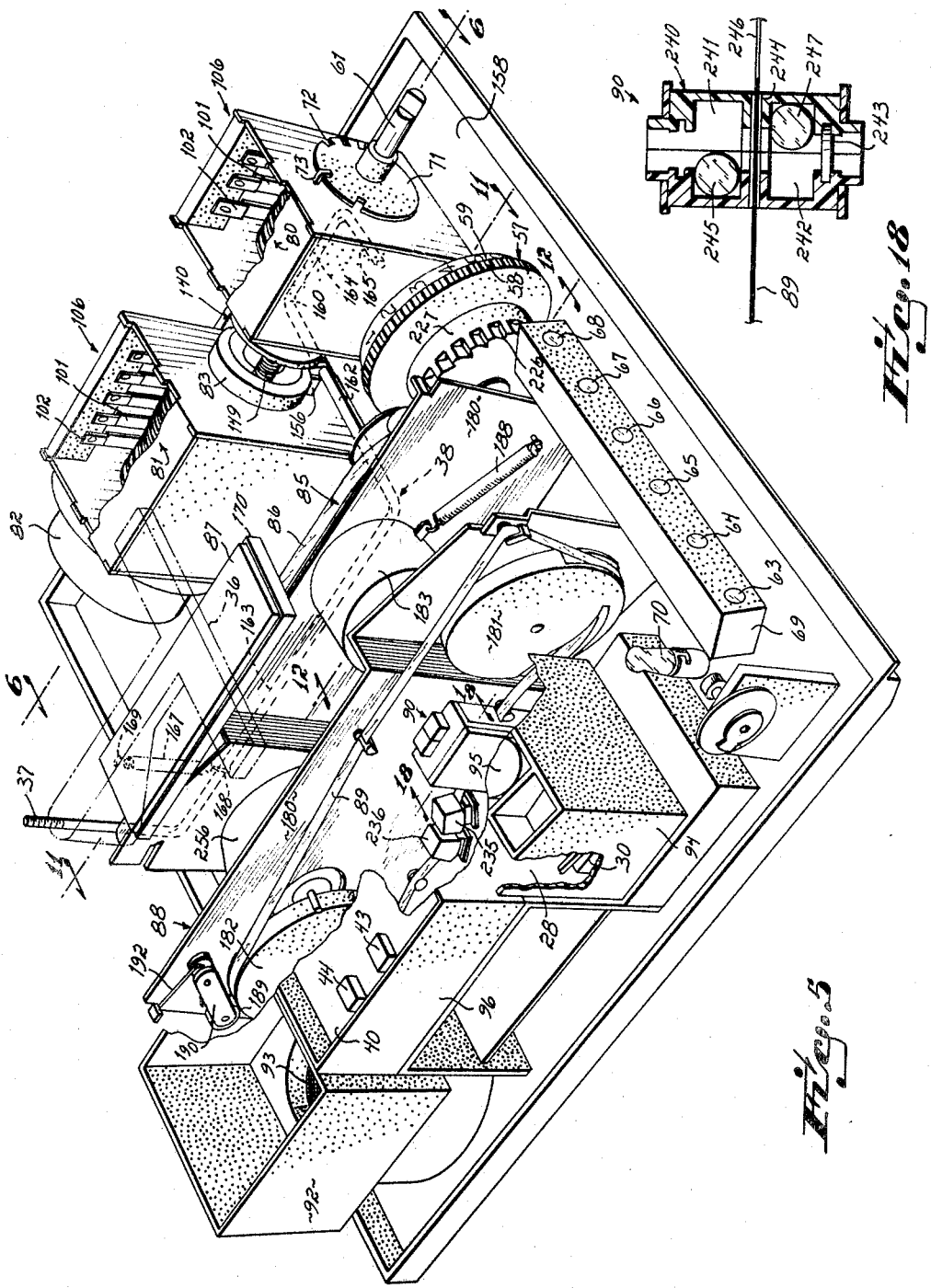

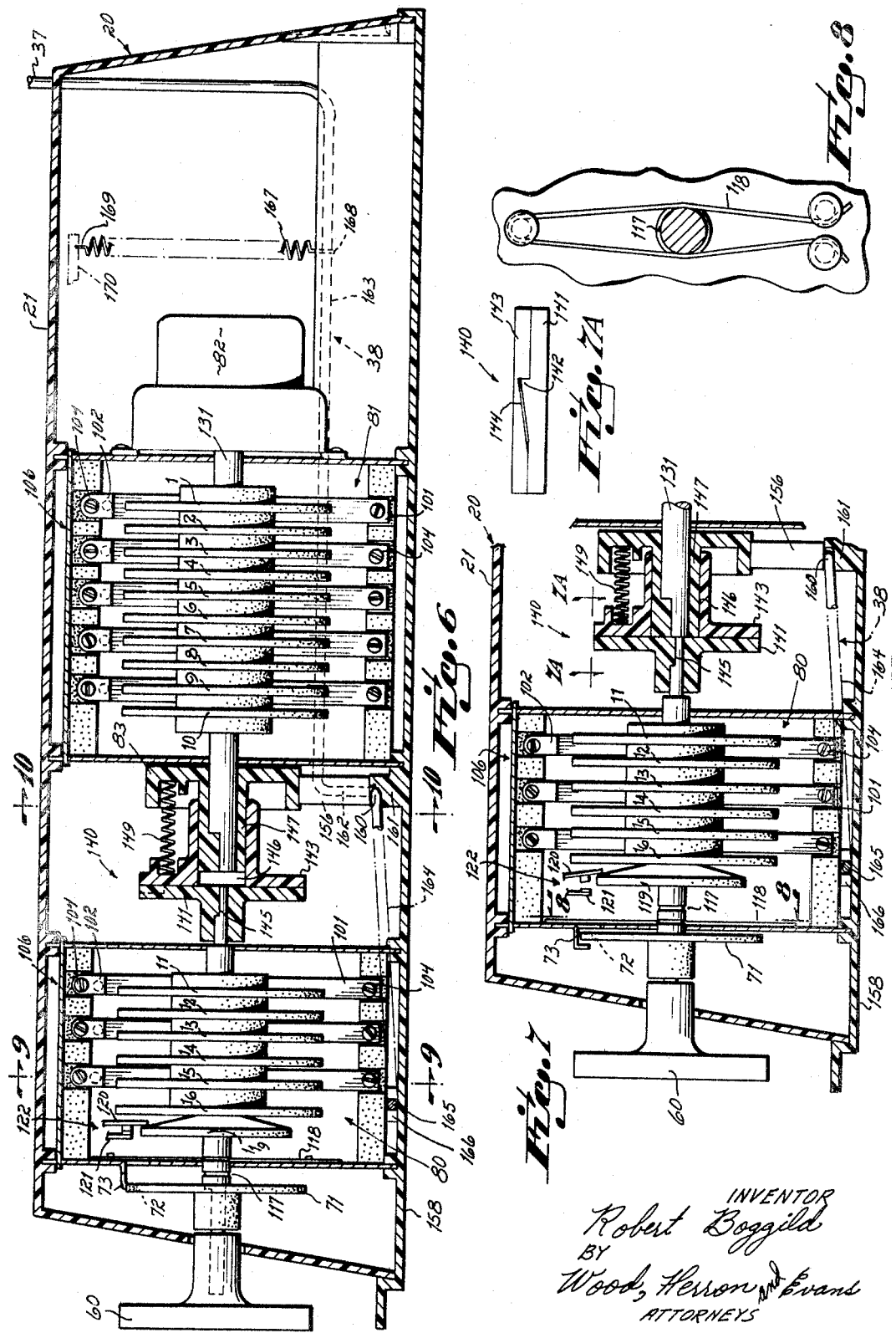

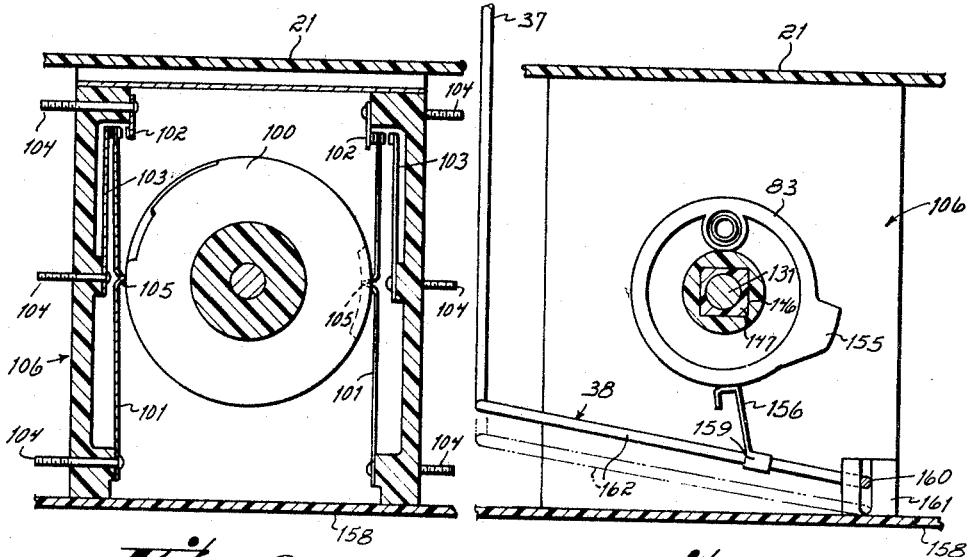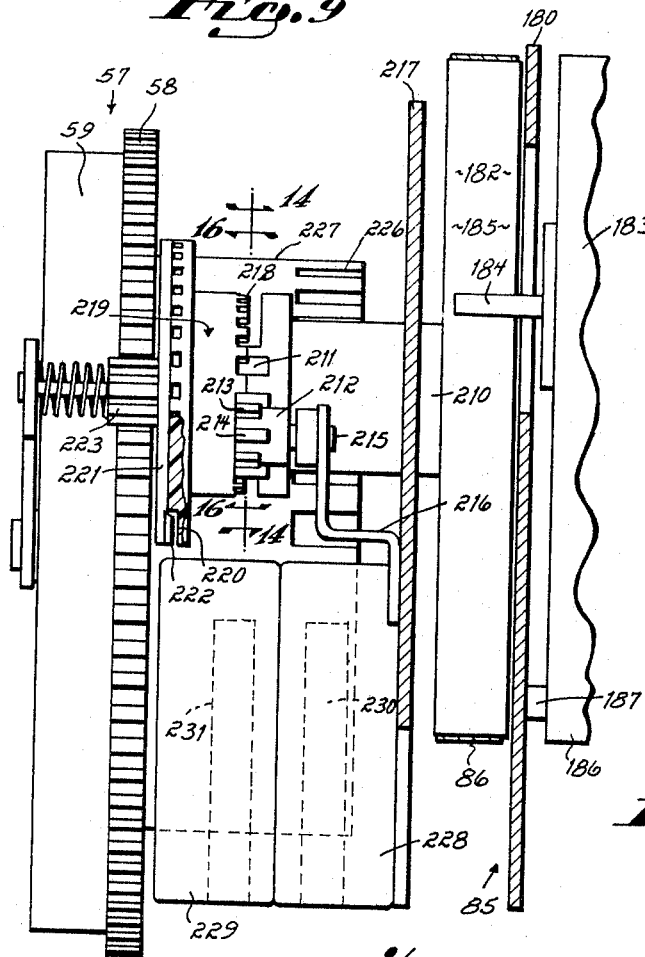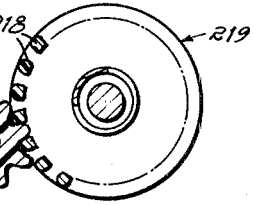

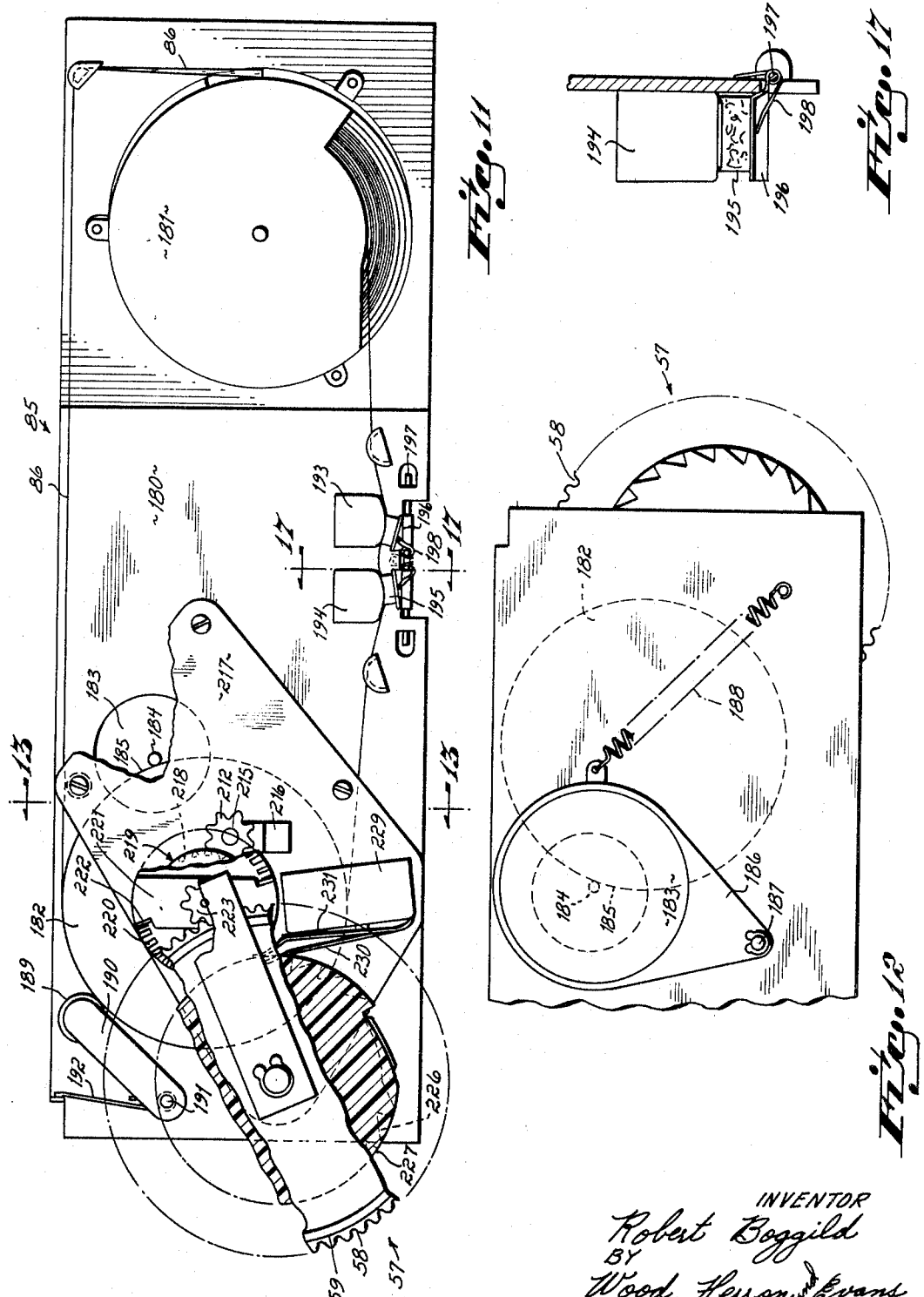

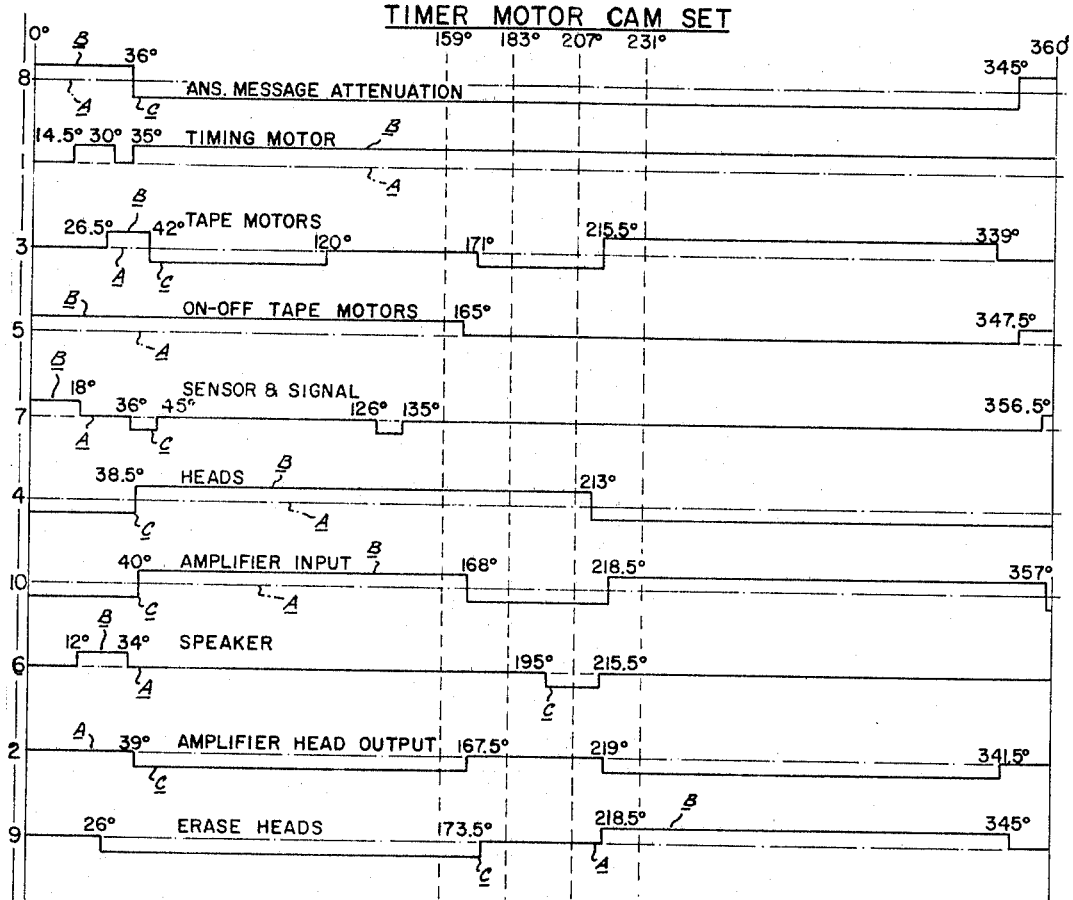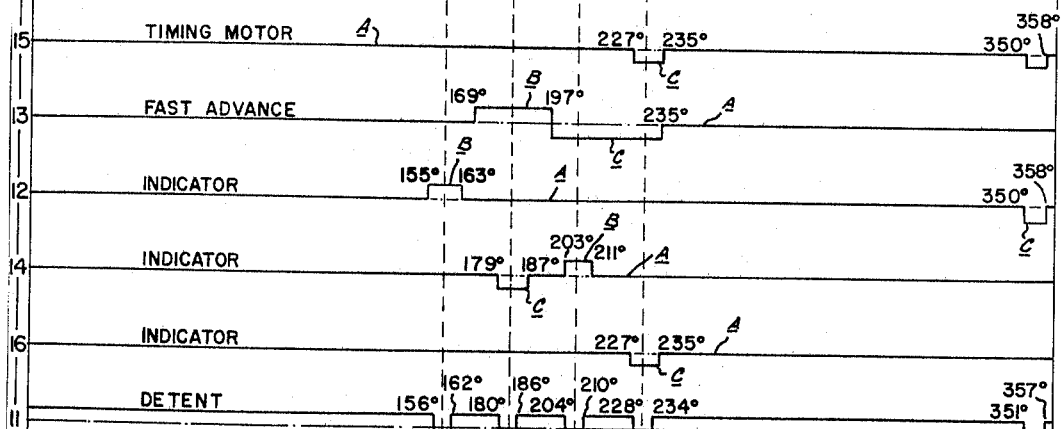
Fig. 19

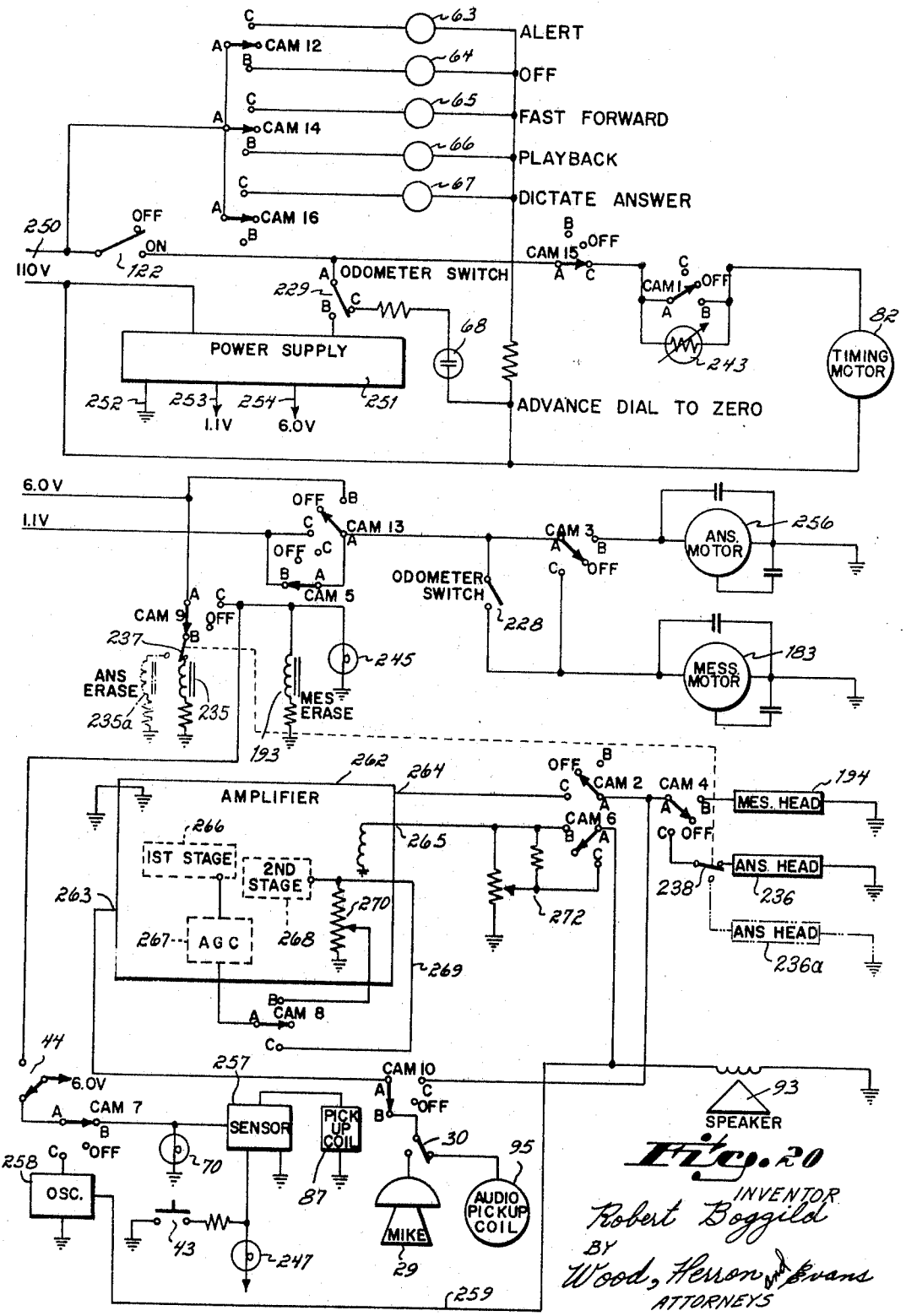

United States Patent Office 3,480,731
Patented Nov. 25, 1969

3,480,731
TELEPHONE ANSWERING APPARATUS WITH SELECTOR AND CONTROL CAMS ON A COMMON SHAFT
Robert Boggild, Cincinnati, Ohio, assignor to Echo Development Co., Cincinnati, Ohio, a limited partnership of Ohio
Filed Aug. 15, 1966, Ser. No. 572,268
Int. Cl. H04m 11/00
U.S. Cl. 179—6                                    15 Claims

ABSTRACT OF THE DISCLOSURE

Telephone answering apparatus having a set of selector cams and a set of control cams interconnected by an overrunning clutch, a control knob for rotating the cams together, and a timer motor for rotating the control cams independently of the selector cams.

---

This invention relates to telephone answering apparatus. More particularly, the invention relates to telephone answering apparatus with which a user may record an answer, which will automatically play the answer to a caller, which will record messages from the callers, and which will enable the user to play back the messages which the callers have recorded.

There are disclosed in the patent literature a great many telephone answering devices of many different types. These disclosures may usually be characterized in one of two ways. Either the device is extremely complex from the standpoint of the manipulations which the user must make in order to perform all of the desired functions or, alternatively, the device is reasonably simple to operate but is not completely adequate from the standpoint of the user in that a number of important functions or conveniences are not provided.

It has been an objective of the present invention to provide telephone answering apparatus in which all necessary functions can be performed; in which the functions may be performed with an absolute minimum of operations on the part of the user; and in which the possibility of improper operation on the part of the user is substantially eliminated.

To achieve the desired performance features referred to above, the invention provides a telephone answering apparatus utilizing a single, rotatable selector or control knob for the selection and initiation of all of the different functions. More particularly, the device has two sets of cam operated contacts, one set being operated exclusively by the rotatable selector knob and the other set being operated in part by the selector knob and in part by a timer motor. An indicator associated with the selector knob enables the operator to select one of the several functions which the device is to perform and to initiate the performance of the function simply by rotating the selector knob to the indicated position and moving the selector knob axially to close the circuit which initiates the operation. Since a single selector knob is used to select all of the major functions and since the operation of the functions can only be begun by axial movement of the selector knob after it has been rotated to the desired function, it is next to impossible for the user to set the device for the wrong function or to become confused as to how to operate the device.

Another objective of the invention is to provide apparatus which will permit the recording of a predetermined number of messages from different callers and to provide visual indication of the number of messages which have been recorded. The visual indicator includes a rotatable odometer wheel which is automatically rotated for indicating purposes by an endless message recording tape. The odometer wheel is also manually rotatable so as to permit the user to return the apparatus to its starting condition whereby a complete series of messages can be recorded, the return being made simply by rotating the odometer wheel. The odometer indicator combined with a high speed drive of the message tape also permits the user conveniently to return to any particular message which he wishes to have replayed without requiring him to listen to all of the previously recorded messages.

Provision is also made for turning off the message motor by means of contacts associated with the odometer, thereby providing assurance of the accuracy of the relationship between the odometer indications and the position of the messages on the tape. Thus, in a sense, the message tape itself controls the point at which messages are begun and terminated and eliminates the cumulative effects of a slight disparity in the speed of the timer motor and the message tape motor. Similarly, the means are provided for the answer tape to control the switching of the answer motor, thereby providing assurance that no cumulative error will occur in the answer tape which would cause the answer tape to begin its operation at varying positions.

In the following detailed description there will be described novel structural and electrical combinations used to attain the desired functional features specifically referred to above as well as subsidiary functional features derived from the primary features. The detailed description is taken in conjunction with the accompanying drawings in which:

FIGS. 1–4 are perspective views of the invention in four of its conditions of operation as seen by the user, FIG. 5 is a perspective view with some of the electrical components omitted and structural portions broken away for clarity, showing the main operating components, FIG. 6 is a cross sectional view partly in elevation taken along lines 6—6 of FIG. 5, FIG. 7 is a fragmentary view similar to FIG. 6 illustrating the selector knob in its inward "off" position, FIG. 7A is an elevational view taken along lines 7A—7A of FIG. 7 illustrating the tooth and detent of the one-way clutch which couples the selector cams with the control cams, FIG. 8 is a cross sectional view taken along lines 8—8 of FIG. 7 showing a spring detent for holding the selector knob in its desired axial position, FIG. 9 is a cross sectional view taken along lines 9—9 of FIG. 6 illustrating a representative cam and contact assembly, FIG. 10 is a cross sectional view taken along lines 10—10 of FIG. 6 illustrating the cam which is used to lift the telephone handpiece, FIG. 11 is a side elevational view partially broken away taken along lines 11—11 of FIG. 5 illustrating a tape deck, in this case the message tape deck, FIG. 12 is a side elevational view taken along lines 12—12 of FIG. 5 showing a portion of the opposite side of the tape deck illustrated in FIG. 11, FIG. 13 is a cross sectional view taken along lines 13—13 of FIG. 11 illustrating the odometer mechanism of the device, FIGS. 14 and 15 are cross sectional views taken along lines 14—14 of FIG. 13, FIG. 16 is a cross sectional view taken along lines 16—16 of FIG. 13, FIG. 17 is a cross sectional view taken along lines 17—17 of FIG. 11, FIG. 18 is a cross sectional view taken along lines 18—18 of FIG. 5 illustrating the photoconductor and lamp unit, FIG. 19 is a cam diagram of the selector and control cams in their respective positions, and FIG. 20 is a circuit diagram of the electrical components of the invention.

As indicated above, the objective of the invention has been to provide a telephone answering device which, from the standpoint of the operator, is extremely simple to operate and substantially fail-safe. As can be seen from FIGS. 1–4, the device is substantially devoid of all but one operating element, namely, the selector knob to be described. The operating mechanism is enclosed in a housing 20 having a support or top surface 21 to receive a telephone 22. The telephone 22 has a handpiece 23 which includes a mouthpiece 24 containing a microphone and an earpiece 25 containing a speaker. The housing 20 has a recess 26 shaped to receive the mouthpiece 24 and a recess 27 shaped to receive the earpiece 25. The recess 27 has a opening 28 into which a small microphone 29 is normally deposited, the microphone 29 being used to dictate an answer on the answer tape as will be described below. When properly positioned in the opening 28, the microphone 29 engages a switch 30 (FIG. 5). The switch 30 is adapted to shift the electrical input circuit to the system amplifier between an audio pickup coil inductively coupled to the earpiece and the microphone. When in the opening 28, the switch connects the audio pickup coil to the circuit and when it is out of the opening, as shown in FIG. 2, the microphone 29 is connected to the amplifier. Thus, the operator is freed of any responsibility for properly setting the system for normal operation or answer recording.

The telephone has a cradle 35 with on-off buttons, not shown, projecting above it and normally engageable by the handpiece 23. When in condition for performing its telephone answering function with the handpiece disposed in the recesses 26 and 27, the on-off buttons are engaged by a T-shaped arm 36 which is secured to the upper end of a leg 37 forming a part of a cam operated rod 38 to be described more fully below.

Between the two recesses 26 and 27 is a third recess 40 normally covered by a cap 41 pivotally mounted at 42 in the recess. The recess contains a "manual" pushbutton switch 43 through which the operation of the apparatus may be initiated manually without requiring the ringing of the telephone and "erase" pushbutton switch 44 which, when depressed, may be used to erase messages on the message tape with the message tape being driven at a high speed.

The housing 20 has a front wall 50 having six indicator windows 51, 52, 53, 54, 55, and 56. An odometer wheel 57 having gear teeth 58 on its edge and a calibrated surface 59 (FIG. 5) indicates to the user the number of messages which have been recorded. A selector knob 60 is fixed to a stem 61, the selector knob being rotatable as well as axially movable within limits.

The indicator windows 51–56 bear the following legends respectively: "alert," "off," "fast forward," "playback," "dictate answer," and "advance dial to zero." At the lower portion of each window is a transparent portion 62 through which a small light can shine to indicate that the device is set to operate on the particular mode specified by the indicia on the window. The indicator lights are small neon bulbs 63–68 mounted in a block 69 located immediately behind the indicator windows. Additionally, an incandescent bulb 70 is mounted behind the alert window 51 (FIG. 5).

The selector knob stem 61 is fixed to a disk 71 having five notches 72 corresponding to all of the window positions 51–56 except the "off" position 52. The notches cooperate with an L-shaped detent 73 overhanging the edge of the disk 71. The detent 73 blocks outward movement of the selector knob 60 except when the disk 71 is aligned with the detent 73. Further, when the selector knob is withdrawn and the detent 73 is lodged in a notch 72, the selector knob is blocked from rotation. The selector knob operates cam contacts which cause the illumination of the neon bulbs 63–68 when the selector knob is depressed and rotated. Thus, the user, by rotating the selector knob and observing the light shining through the selected opening 62, can observe the particular mode of operation he selects as he rotates the selector knob as indicated in the first five indicator windows. The sixth window 56 is illuminated by a separate circuit controlled by the odometer 57 when the message tape is full as, for example, after twenty messages have been recorded. Further, the complete alert window 51 is illuminated by the incandescent lamp 70 only when the selector knob has been rotated to the position corresponding to the alert window 51 and then withdrawn to close the main contacts to the system.

OPERATION AS THE USER SEES IT

Let it be assumed that an answer message has been recorded on the answer tape. The user places the handpiece in the position shown in FIG. 1 and rotates the selector knob 60 until the signal light in the opening 62 of alert window 51 is lit. He then pulls the selector knob to close the main circuit contacts and the incandescent bulb 70 is energized to illuminate the full alert window showing the user that the system is in condition to operate. The user can manually rotate the odometer wheel 57 to the start position or, if he does not wish to have the few messages already on the message tape erased, he can simply leave the odometer wheel at its last position. As far as the user is concerned, nothing more is required in order to place the device in condition to answer the phone and record messages.

When the phone rings, the arm 36 is raised and the answer tape plays a prerecorded message into the telephone mouthpiece which advises the caller that he can record a message to the user. The caller waits until he hears a signal tone and then dictates for up to twenty seconds. Shortly thereafter, the arm 36 is depressed, returning the phone to its original condition. This sequence of operations may be repeated up to twenty times (or any other number, depending upon the capacity of the tape deck) whereupon the device is rendered inoperative.

When the user returns, he notes on the odometer dial 59 that several messages have been recorded on the message tape. To listen to the messages, he depresses the selector knob 60 and rotates it until the indicator light on fast forward is illuminated and then he withdraws the selector knob to run the message tape (which is endless) at a high speed through the remaining unrecorded sections until the tape has returned to the start position. The device automatically shuts itself off at this position and the user may then hear the messages simply by depressing the selector knob, rotating the odometer wheel to "start," rotating the selector knob until the indicator light at the playback window is illuminated, and then withdrawing the selector knob. If he wishes to stop the tape at any point during the playback, he merely depresses the selector knob and then withdraws it to restart the tape. If he wishes to skip quickly over early messages, he can do so by operating the device at "fast forward" before shifting to "playback."

Thus, it can be seen that for the normal operation of the device, only a few simple, well indicated manipulations of the selector knob are necessary.

The only other major operation normally required by the user is the recording of answers on the answer tape. This is done by withdrawing the microphone 29 from the opening 28 and setting the selector knob to "dictate answer" position as indicated by the window 55. When the selector knob is withdrawn, the user begins his dictation which may be fifteen or twenty seconds in length. The timer motor will turn the answer tape off at the end of the preselected period in a manner to be described below so that the operator does not need to be concerned that he will run the answer tape too long. If the operator wishes to listen to the answer which he has dictated to be sure that it has been recorded properly on the answer tape, he merely sets the apparatus to the alert condition described above and by depressing the manual button 43, the cycle of operations is begun, the first portion of which being the playback of the answer. This operation will use one section of the message tape but this presents no problem for the operator merely manually rotates the odometer dial 59 to the start position.

On some occasions, the user may wish to erase recorded messages although this is not normally required for the messages are normally erased as new messages are dictated upon the message tape. However, should he desire to have the message tape completely erased, he merely sets the apparatus to fast forward as described above and depresses erase button 44 while pulling out the selector knob. The message tape is then driven at a high speed through its complete length with the erase head operative to erase all recorded messages. By having the erase button 44 in a recess covered by the plate 41, this erase function has to be a deliberate action, thereby preventing any inadvertent erasing of messages.

THE OPERATING MECHANISM

The general organization of the operating mechanism is illustrated in FIG. 5. The principal control of the operation of the apparatus is provided by two sets of cams: a selector set 80 and a control set 81. The cams 80 are manually operated by the selector knob and in general are used to select a particular function. The cams 81 provide for the control of automatic sequence of operations of the elements of the apparatus and are normally operated by a timer motor 82 but may have their angular positions preset by the rotation of the selector knob 60. A telephone cam 83 is coaxial with the cams 80 and 81 and controls the operation of the arm 36 which operates the push buttons in the telephone cradle.

A message tape deck 85 carrying a message tape 86 is mounted adjacent the cam sets 80 and 81 and includes the odometer wheel 57 as well as the drive therefor. An induction pickup coil 87 is mounted above the message tape deck and it is adapted to be inductively coupled to the telephone bell to initiate the operation of the device as will be described.

An answer tape deck 88 is located adjacent the message tape deck. The answer tape deck is substantially identical to the message tape deck except that the answer tape is only a fraction of the length of the message tape and only approximately 20 seconds is required for the answer tape to run through its cycle. The answer tape indicated at 89 passes through a photoconductor and photolight assembly 90. The assembly includes a photoconductor which is in series with the timer motor and operates as a switch for the timer motor when it is illuminated by either one or two photolights in the assembly. One of the photolights is normally occluded by the major portion of the answer tape, the answer tape having a short transparent section which passes in front of the photolight to permit the illumination of the photoconductor for a short period. The other photolight is in communication with the photoconductor but remains deenergized until a preselected period in the cycle of operation. The remaining section of the apparatus that normally disposed below the handpiece and includes a housing 92 for a speaker 93 whose acoustical waves are directed toward the mouthpiece 24 and a housing 94 for the audio pickup coil 95 which is normally inductively coupled to the speaker in the earpiece of the handpiece. Between the two housings 92 and 94 is a housing 96 in which the manual switch 43 and erase switch 44 are mounted.

CAM OPERATED CONTACTS

All cam operated contacts are substantially identical and are illustrated in FIG. 9. Each includes a generally circular cam 100 upon which rides a resilient follower or movable contact 101 which is engageable with a fixed contact 102 in one of its extreme positions or a fixed contact 103 in the other of its extreme positions. The contacts 101–103 are each provided with terminals 104 by which they may be connected into the circuit. The follower contact 101 has a protuberance 105 which engages the peripheral surface of its respective cam 100. The surface of cam 100 is contoured to one of three levels adapted to bring the movable contact into contact selectively with either of the fixed contacts 102 and 103 or to a central position between the two contacts to create an open circuit to both contacts. As can be seen by reference to FIGS. 6 and 9, the contacts cooperating with alternate cams are placed on opposite sides of a housing 106 within which the cams and contacts are contained. Thus, as viewed from the front or selector knob end of the apparatus, the first, third et seq. cams cooperate with contacts on the right side of the housing and the second, fourth et seq. cams cooperate with contacts on the left side of the housing. In describing the electrical circuit below, reference will be made to the B and C positions of the cam contacts and it is to be understood that these positions correspond to the engagement of the fixed contacts 102 or 103.

Referring now to FIG. 6, the cams in the selector knob set 80 are sequentially numbered 11, 12, 13, 14, 15, and 16. The cams are fixed to the selector knob stem 61 and rotate with it as the selector knob is rotated. Cam 11 does not cooperate with any contacts but is simply a detent cam having notches around its periphery cooperating with a resilient detent. The detent cam assures proper alignment of the notches 72 in the disk 71 with the detent 73 and gives the user the "feel" of the notches being precisely positioned. Cams 12, 14, and 16 are indicator cams whose contacts cooperate with the respective neon indicator bulbs 63–68 in the block 69. Cam 13 is a fast advance cam and cam 15 is a timing motor cam. The selector knob stem 61 is adapted to be shifted axially by pushing or pulling on the selector knob 60. The stem has two spaced annular grooves 117 which cooperate with a spring clip 118 to fix the stem 61 in either of its two axial positions. The stem also has a fixed flange 119 which is engageable with a movable contact 120 engageable with a fixed contact 121. The contacts 120, 121 form a switch 122 which is in series with the 110 volt supply to the system. When the selector knob is withdrawn as shown in FIG. 6, the movable contact 120 is engaged with the fixed contact 121 and the 110 volt circuit is closed. At that time, the detent 73 is lodged in one of the notches 72 to prevent rotation of the selector knob.

When the knob is depressed as shown in FIG. 7, the movable contact 120 has been moved away from the fixed contact 121 to open the supply circuit and the disk 71 has moved out of the path of the detent 73 to permit the rotation of the disk as well as the stem 61 and the cams which it carries.

The timer motor cam set contains ten cams numbered sequentially from 1–10. These cams are fixed on a timer motor output shaft 131 which is connected to the timer motor 82 through a one-way or overrunning clutch, not shown. The overrunning clutch is of the type having a spring grip which provides instantaneous coupling of the timer motor with the shaft when the timer motor rotates in the driving direction. The timer motor is also connected to the shaft through stepdown gearing which, in the illustrated embodiment, causes full rotation of the shaft 131 every 67½ seconds, which amounts to approximately 6° of rotation for each second of motor operation.

While all cam functions will be described in detail below, the cams are designated as follows: 1 timer motor 2 amplifier head output, 3 tape motors, 4 answer and message heads, 5 on-off tape motors, 6 speaker, 7 sensor and signal, 8 answer message attenuation, 9 erase heads, and 10 amplifier input.

An overrunning clutch 140 interconnects the selector knob stem 61 and the timer motor shaft 131. The overrunning clutch is adapted to permit the selector knob to rotate and carry with it the timer motor shaft 131 and to permit the timer motor shaft to rotate completely independently of the selector knob stem 61. The clutch includes a driving member 141 having a single tooth 142 engageable within a recess 144 (FIG. 7A) of a driven member 143. The driving member 141 is fixed against rotation by resting on a flange surface 145 at the end of the selector knob stem 61. The driven member 143 has a square aperture 146 that mates with a square sleeve 147 integral with the cam 83 fixed on the motor shaft 131. The mating square aperture and sleeve connection between the driven member 143 and the sleeve 147 permits axial movement of the driven member while preventing rotative movement with respect to the shaft. A compression spring 149 urges the driven member into engagement with the driving member. During axial shifting of the selector knob, the compression spring 149 which engages the driven member 144 of the clutch 140 holds the clutch faces in engagement. The single tooth engaged between the driving and driven members of the clutch provides assurance that when the clutch faces are drivingly engaged, the cams of the set 80 will have the desired angular orientation with the cams in the set 81 and that orientation will always remain the same under the conditions of driving engagement.

The cam 83 on the timer shaft has a protuberance 155 (FIG. 10) which engages a follower 156 secured at one end 159 to the rod 38 which controls the operation of the arm 36 in engagement with the telephone push buttons. The rod 38 has a leg 160 slidably mounted in a block 161 on the base 158 of the housing. The leg 160 is integral with and at a right angle to a leg 162 to which the follower 156 is fixed. The rod continues in a longitudinally extending leg 163 which extends the rod to the rearward end of the housing. The leg 37 projects upwardly from the leg 163 and the arm 36 is connected to the leg 37. A leg 164 is integral with leg 162 and extends forwardly and terminates in a transverse pivot portion 165 mounted in bearing block 166. A tension spring 167 is fixed at one end 168 to the leg 163 and at the other end 169 to a mounting bracket 170 for the bell pickup coil assembly 87. The spring 167 normally urges the rod in an upward position in which it releases the telephone buttons for operation. The engagement of the protuberance 155 on the cam 83 with the follower 156 depresses the follower and the rod to push both phone buttons down to an inoperative position. When, through the operation of the timer motor 87, the protuberance 155 rides off the follower 156, the rod 37 pivots about the leg 165 and snaps up, releasing the buttons on the telephone for operation.

TAPE DECKS

The two tape decks 85 and 88 are substantially identical, the tape decks differing from each other only in the length of the tape in each. Message tape deck 85 is illustrated in FIGS. 11 and 12 and includes a mounting plate 180 to which a storage reel 181 and a drive pulley 182 are mounted. The major portion of the tape is disposed in the storage reel with the tape passing around the drive pulley 182. The drive pulley is driven by a message motor 183 having a shaft 184 in frictional engagement with a surface 185 of the pulley 182. The message motor is mounted on a bracket 186 which is pivoted on a pin 187 fixed to the support plate 180 and is urged by a spring 188 toward the pulley so as to bring the shaft 185 into frictional engagement with the pulley.

A pressure roll 189 is rotatably mounted on an arm 190 which is pivoted on a pin 191 fixed to the support plate 180. A spring 192 urges the arm toward the pulley to press the pressure roller 189 against the tape passing around the pulley. The tape moves clockwise as viewed in FIG. 11 and passes first under an erase head 193 and then an adjacent recording head 194. The tape is urged against the heads by felt pads 195 which are mounted on arms 196 pivoted on a pin 197 to the support plate and urged by a spring 198 into engagement with the respective heads.

As the tape motor 183 rotates, the pulley 182 is caused to rotate, carrying with it the message tape 86. The message tape 86 is held in frictional engagement with the pulley by the pressure roller 189 so as to impart enough force to the tape to withdraw it from the reel 181. As tape is withdrawn from the reel 181, the tape in that reel rotates, pulling with it the upper flight of the tape which stores itself in the reel.

ODOMETER

The odometer is driven from the tape drive pulley 182 and reference will be made to FIGS. 11–16 for its description. Coaxially with the pulley 182 and projecting from it is a sleeve 210. The sleeve carries at its end a U-shaped lug 211 which, with each revolution of the pulley, engages a tooth on a pinion 212. The pinion 212 has alternating short teeth 213 and long teeth 214 as measured in the axial direction. The lug 211 embraces only the long teeth 214. The pinion 212 is rotatably mounted on a pin 215 fixed to a bracket 216 mounted on a support plate 217. Support plate 217 is fixed to and spaced from the support plate 180. All of the teeth of the pinion 212 are in mesh with teeth 218 of gear 219 which forms the driving member of an overrunning clutch. The gear 219 has facial teeth 220 which are engaged by a driven member 221 having a pair of inclined pawl-forming teeth 222 in engagement with the facial teeth 220. A gear 223 is fixed to the driven member 221 and is in mesh with teeth 58 on the main odometer wheel 57. The main odometer wheel 57 also has twenty ratchet teeth 226 corresponding to the twenty messages which can be played on the message tape. Adjacent the ratchet teeth 226 is a single tooth or cam 227 (FIG. 11) which corresponds to the end of the final message on the message tape.

A pair of microswitches 228 and 229 have fingers 230 and 231 disposed in the path of the ratchet teeth 226 and cam tooth 227, respectively.

The odometer operates as follows: As the message pulley 182 rotates, it carries the sleeve 210 and with each revolution engages a tooth 214 on the pinion 212 to rotate the pinion through approximately one-fourth turn. The rotation of the pinion 212 causes the driven member 219 of the overrunning clutch to rotate a fraction of a revolution. The rotation of the driven member, acting through the driving member 221, rotates the gear 223 and hence the odometer wheel. After the odometer wheel has rotated approximately one-twentieth of a revolution, the finger 230 associated with microswitch 228 drops into the space between the ratchet teeth and opens a switch in circuit with the message motor 183. After twenty such cycles of operation, the finger 231 of the microswitch 229 drops into the cam slot 227 and operates a switch which disconnects the low voltage power supply from the system and closes the circuit to a lamp, indicating that the message reel is full.

The one-way clutch permits the main odometer wheel 57 to be rotated freely to bring it to any position, usually the start position. Thus, it is possible to reset the answering device to a full twenty messages merely by rotating the odometer wheel and without having to run the message tape completely through the remainder of its twenty cycles of messages.

ANSWER TAPE DECK

As stated above, the answer tape deck 88 is substantially identical to the message tape deck. The answer tape deck is best illustrated in FIG. 5 and includes an erase head 235 and an answer head 236. In an alternative embodiment, the erase and answer heads will be dual heads of the type used in stereographic reproduction and the alternate heads 235a and 236a will be selectively connectable to the electrical system by ganged switches 237 and 238 (FIG. 20). Through this dual track system, it is possible to record two different answers on the answer tape, thereby permitting the user to select an appropriate answer depending upon the particular condition of his activity, thereby minimizing the requirement for re-recording.

The answer tape deck has no odometer mechanism but it does have the photoconductor block 90. The photoconductor block is illustrated in the cross sectional view 18 and includes a housing 240 having two bulb cavities 241 and 242, a photoconductor 243 adjacent the cavity 242, and a slot 244 between the two cavities. The tape 89 passes through the slot 244 and normally forms a barrier between the two cavities. An answer tape bulb 245 is disposed in the cavity 241 and is normally blocked from illuminating the photoconductor 243 by the answer tape 89. However, the answer tape has a clear section 246 which passes through the slot 244 at the end of the answer tape cycle and permits the bulb 245 to illuminate the photoconductor 243, dropping its resistance from 100,000 ohms to 300 ohms.

A sensor light 247 is disposed in the cavity 242 and is adapted to illuminate the photoconductor 243 whenever it is energized. As will be explained in connection with the circuit diagram, the sensor light 247 is illuminated during the ringing of the phone or when the manual start button is depressed to initiate the operation of the apparatus.

ELECTRICAL CIRCUIT

The timer motor 82 is energized through a 110 volt source 250 through a series connection of the manual pushbutton switch 122 (operated by the selector knob), contact C of cam 15 and contact B of cam 1. Contact B of cam 1 is in parallel with the photoconductor 243 of the photolight assembly 90.

The 110 volt source is also connected to the five indicator lights 63, 64, 65, 66, and 67 by means of the C and B contacts of cam 12, the C and B contacts of cam 14, and the C contact of cam 16.

The 110 volt AC source is also connected to an indicator light 68 which indicates "advance dial to zero" because the message reel is full, the connection to that light being made through contact C of odometer switch 229. Contact B of the odometer switch 229 connects the AC source to the power supply 251 which has a common connection 252, a 1.1 volt connection 253 and a 6 volt connection 254 providing direct current voltage of the magnitudes indicated. When the odometer switch 229 is at B position, the AC source is connected to the power supply so that the devices which operate on either the 1.1 volt or 6 volt direct current may be operated. However, when the message reel has been filled and the odometer switch is caused to move to the C position, it is no longer possible to supply power to certain of the circuit elements including the tape motors. Thus, it is impossible to erase and re-record over the recorded messages until the odometer switch is manually shifted to the B position.

The answer motor 256 (motor for the answer tape 89) and the message motor 183 (motor for the message tape 86) are connected to the direct current power supply selectively through the B contacts or C contacts of cam 3, respectively. The message motor 183 additionally may be connected to the direct current source through a holding contact of switch 228 which is operated by the message odometer, the holding contact being closed shortly after the beginning of the recording of each message and opened at the end of the recording. The direct current power is fed to both motors through cam 13 and normally comes through contact C of that cam which connects the motors to the 1.1 volt supply. When the contact 13B is closed, the motor circuit is connected to the 6 volt source thereby permitting the rapid advance of the motor. As will be described below, the system of cams permits the rapid advance only of the message motor 183.

The answer motor 256 has an erase head 235 associated with it and the message motor has an erase head 193 associated with it. The erase heads 235 and 193 are selectively connected to the 6 volt source through contacts B and C of cam 9. Contact C of cam 9 also connects the tape photolight 245 to the 6 volt source when the message erase head 193 is operative. The erase heads 235 and 193 may also be directly connected to the 6 volt supply through the separately operated, spring loaded, manual erase pushbutton switch 44 described above. The normal position of switch 44 is as shown in the drawings opening the manual circuit to the message erase head while closing the circuit to cam 7 and associated elements to be described below. Thus, the operation of the manual erase switch 44 to connect the message erase head to a source of 6 volt power can only be done as a deliberate effort, thereby avoiding any possibility of inadvertent erasure of the messages on the message tape. Normally, switch 44 is used only to erase the message tape when the message motor is set on fast forward.

Contact B of cam 7 also connects the 6 volt supply to an automatic operation signal light 70. That light is operable only when the timer motor cam 1 is set at its starting position and only when the selector knob 60 is withdrawn. Thus, the user is assured when he sees the "alert" panel illuminated that the device is set for proper operation.

Contact B of cam 7 also connects the 6 volt supply to a transistorized sensor circuit 257 which acts as a relay by which the power supply is connected to the light source 247 disposed adjacent the photoconductor 243 of the photolight assembly 90. The circuit to the light 247 is normally open and is closed only when the pickup coil 87 is energized to put a voltage on sensor circuit 257 through the ringing of the phone. Thus, each time the phone rings, the light 247 glows and closes the photoconductor circuit to permit the timer motor 82 to jog forward. A manual start button 43 is in series with the photoconductor light and can close a 6 volt circuit to the photoconductor light for manually starting the timer motor 82.

Contact C of cam 7 connects a tone generator or oscillator 258 to the 6 volt supply. The tone generator 258 is connected directly to the speaker 93 through conductor 259. When energized by the closing of contact C, before and during the recording of a message, a signal is generated and fed through the speaker 93 to the mouthpiece of the telephone to advise the caller to begin his message and to end his message.

A signal amplifier 262 has an input connection 263 and two output connections 264 and 165 and is adapted to serve all of the audible functions.

In the amplifier there is an attenuation circuit which is programmed by cam 8. A first amplifier stage 266 feeds into an automatic gain control 267, the output of which is connected to the movable contact of cam 8. When that movable contact is in the C position, the automatic gain control output is fed directly into a second amplifier stage 268 via conductor 269. When the movable contact is in the B position, the output of the automatic gain control 267 is fed into a voltage divider 270 which permits only twenty percent of the first stage output to go into the second stage of the amplifier. This attenuator system is used to shift the output to the speaker 93 between high and low volume depending on whether the device is set for playback to the user when maximum volume is desired and automatic operation during which the answer message is fed into the telephone mouthpiece and minimum volume is desired.

The answer tape has an answer head 236 which is selectively connectable to the amplifier by contact C of cam 4. Similarly, the message tape has a message head 194 associated with it, the message head being selectively connected to the amplifier by contact B of cam 4. The heads 236 and 194 are the magnetic transducers which either record or pick up a signal on the magnetic tapes with which they are associated.

The magnetic heads 236 and 194 are selectively connected either to the input or the output of the amplifier by means of cams 2 and 10. When contact C of cam 10 is closed and contact C of cam 2 is opened, the heads are connected to the input 263 of the amplifier 262. When the position is reversed, that is, the contact C of cam 10 is opened and contact C of cam 2 is closed, the heads are connected to the output 264 of the amplifier 262. The heads are connected to the output for recording purposes and are connected to the input for reproduction purposes.

When the magnetic heads 236 or 194 are connected to the input 263 of the amplifier, the output 265 of the amplifier is connected through the contacts of cam 6 to the speaker 93. Contact B of cam 6 connects the output directly to the speaker 93 and contact C of cam 6 requires the output to be fed through an impedance matching network 272.

When either of the magentic heads 236 or 194 is connected to the output of the amplifier 262 for recording purposes, the signal to be recorded is connected to the input 263. The recorded signals are developed selectively by an audio pickup coil 95 which is normally connected by a spring-loaded switch 30 (engaged by microphone 29) and contact B of cam 10 to the amplifier input 263. The audio pickup coil 95 is mounted on the answering apparatus adjacent the earpiece of the telephone and is inductively coupled to the speaker in the telephone earpiece. Alternatively, the input signal can be derived from the microphone 29 which is connectable by switch 30 and contact B of cam 10 to the input 263. As explained above, the microphone 29 is normally disposed in its proper position on the answering device housing and when in that position depresses the switch 30 to the position shown in which the microphone is disconnected and the audio pickup coil 95 is connected to the amplifier 262. When the microphone is lifted from its position in the casing, the position of switch 30 is reversed so as to disconnect the audio pickup coil 95 and connected the microphone 29 to the amplifier input 263. The microphone 29 is used solely for recording answers on the answer tape.

OPERATION

The operation of the invention can best be understood by particular reference to the circuit diagram of FIG. 20 and the cam diagram of FIG. 19.

The cam diagram represents a full 360° revolution of the shafts associated with the manual selector knob and the timer motor. It will be recalled that the timer motor shaft 131 will rotate clockwise independently of the manual selector shaft 61 and that the one-way clutch 140 connection between the selector shaft and timer shaft requires that the timer motor shaft be rotated with the selector shaft when the selector knob is rotated. Therefore, cams 11 to 16 which are mounted on the selector shaft will normally have a fixed position during the operation of the apparatus, the position being preselected by the operator. On the other hand, the timer motor will, while the selector shaft is fixed, normally rotate through a full cycle of operations with controlled pauses as will appear from the following description.

Let it be assumed that an answer message has been recorded on the answer tape and that the operator has set the selector shaft, and timer motor along with it, to "alert" position at 0°.

As indicated above, some of the contacts associated with the cams have three positions. Normally, in the two extreme positions, the contacts will close a circuit while in an intermediate position between the two extremes the circuit involving the contact will be open. In the circuit diagram the two extreme positions have been indicated as B and C positions and in the cam diagram the upper line is the B position, the lower line is the C position and on the three-position cams the center line or point A is the neutral or off position.

When the selector knob is set for automatic operation on the "alert" position, the selector knob is actually at a position between 351° and 357° while the timer shaft 131 is at 0. This condition permits the timer shaft, when it moves through the end of its cycle, to move approximately 6° beyond the point of engagement of the one-way clutch 140 between the selector shaft 61 and the timer shaft 131 and therefore the clutch is always in position for immediate engagement upon rotation of the selector shaft. In this position, it is seen that contact C of timer motor cam 15 is closed, thereby permitting the circuit to the timer motor 82 to be energized. Contact B of indicator cam 12 is closed, thereby indicating that the device is in the alert position. When the selector knob is withdrawn, contacts 120 and 121 are closed, energizing bulb 70 to advise the user that the device is ready for automatic operation.

When a call is made to the station having the answering apparatus, the ringing of the telephone is picked up by coil 87 which causes the illumination of the sensor photoconductor light 247. Energization of the light 247 reduces the resistance of the photoconductor 243 from 100,000 ohms to 300 ohms, thereby effectively closing a circuit to the timer motor 82. The circuit remains closed only during the period of energization of the light 247 which in turn is illuminated only during the period of the telephone ring. Two or three rings of the telephone causes the timer motor to jog its shaft 131 through 14½° at which point timer motor cam 1 is rotated to shift its contact to the B position, thereby closing the circuit to the timer motor 82 in parallel with the photoconductor.

At the 12° position of the timer shaft contact B of speaker cam 6 closes, thereby connecting the speaker 93 to the output 265 of the amplifier 262. One of the first functions of the apparatus, of course, is to broadcast into the telephone mouthpiece a recorded statement that the calling party is to dictate a message to be recorded.

At 18°, sensor and signal cam 7 contact shifts from the B position to the A or off position.

At approximately 26°, the contact of cam 9 shifts to the C position, thereby energizing the erase heads and tape photolight 245. Tape photolight 245 is the light which is normally blocked from the photoconductor 243 by the answer tape but will illuminate the photoconductor when the answer tape has run its course to the clear section. The energization of the erase head on the message tape is necessary in order to clear the previously recorded message before the new message is recorded.

At 26½°, the contact at tape motor cam 3 is shifted to B position, thereby connecting the drive to the answer motor to the 1.1 volt supply. It should be noted that cam 5 in the circuit to the tape motors has had its contact in the B or on position and that cam 4 associated with the magnetic heads has been in the C position connecting the answer head to the input of the amplifier. Likewise, cam 10 has been in the C position, thereby completing the circuit from the answer head to the input of the amplifier.

At 30°, the contact of timer motor cam 1 shifts to off position, thereby stopping the timer motor. The timer motor will remain de-energized during the period that the answer tape is delivering its message to the caller. More specifically, the timer motor will remain de-energized until the clear portion of the answer tape passes by tape photolight 245, whereupon the timer motor will be energized through a circuit completed by the photoconductor for a short period of time until the B contact on cam 1 can once again be closed.

The timer motor delay at 30° is of approximately twenty seconds' duration which permits the answer motor to run substantially completely through its cycle. During this period, the answer tape delivers a message to the speaker 93 of approximately the following character: "John Doe is out of the office. If you would care to leave a message, begin dictating at the tone signal. After approximately twenty seconds of your dictation, a second tone signal will indicate the end of the recording."

A clear tape section is inserted at the end of the answer tape message to permit photolight 245 to illuminate the photoconductor 243. When the photoconductor 243 is illuminated, the circuit to the timer motor 82 is closed for a period of about 5° of rotation of the timer shaft 131 until the contact of timer motor cam 1 returns to B position to hold the timer motor on. At approximately this time, contact C of cam 7 is closed for about 9° to energize the oscillator and to cause a signal tone to be produced on the speaker 93, thereby indicating to the caller that he should begin the dictation of his message.

Further, at approximately 34°, the movable contact on speaker cam 6 is shifted to the A or off position. Still further, at approximately 38½°, the movable contact on cam 4 to the magnetic heads is shifted from C to B position to disconnect the answer head 236 and to connect the message head 194 so that a message can be recorded on the message tape. Still further, at approximately 40°, the amplifier input cam 10 has its contact shifted from C position to B position to connect the message heads 194 and 236 from the input 263 to the output 264 of the amplifier 262 and to connect the audio pickup coil 95 to the input 263 of the amplifier so that the message received by the pickup coil 95 will be amplified and transmitted to the message head 194 and thereby recorded on the message tape. Still further, the open contact of cam 2 is shifted to the C position, thereby connecting output line 264 of the amplifier 262 to the message head 194.

At approximately 42°, which is during the generation of the tone signal, the movable contact of cam 3 to the tape motors is shifted from the B position to the C position, thereby disconnecting the answer motor 256 and connecting the message motor 183 to drive the message tape. The message motor will remain connected through cam contact 3C at least until the message odometer driven by the message motor closes switch 228 to hold the message motor in the circuit. Thereafter, cam 3 may be shifted to its off position.

All of these circuit changes having been made, the apparatus is in condition to receive a message which is dictated by the caller and is picked up by the magnetic coupling of pickup coil 95 with the telephone earpiece. During the dictation of the message, no circuit changes are made. The timer motor continues to run and will run until it has completed the 360° rotation. The odometer which is driven by the message tape motor will rotate until the actuator finger 230 of switch 228 riding on the cam wheel reaches the next depression at which time the holding switch 228 will be shifted to off position. This is timed to provide approximately a twenty second message. In the meantime, the movable contact on tape motor cam 3 has moved to the off position so that only arm 230 of switch 228 riding on the odometer cam surface holds the message motor in circuit.

At approximately 126°, the movable contact of cam 7 will move to the C position and will stay in that position for approximately 9°, thereby connecting the oscillator 258 to the speaker 93 and applying a tone signal to the speaker.

At 165°, the movable contact of cam 5 in the main tape motor circuit will shift from B position to off position so that throughout the rest of the cycle neither of the tape motors can be driven. Close to the end of the cycle or at about 347°, the contact will shift back to the on position merely to place the answer motor in condition to be operated when the apparatus is recycled.

After the caller's message has been recorded, nothing further of significance occurs until just before the end of the cycle. It will be observed that some switching takes place on some of the cams, but that switching has no effect on the automatic operation of the apparatus. Those portions of the cams are used, however, in the operation of certain of the manual functions as will appear below. During this period (of less than a minute), the telephone circuit will remain open so that any new callers will receive a busy signal.

At the end of the timer motor cycle, certain switch changes are made in order to condition the apparatus for recycling. The changes in position of the cam contacts can be observed from the cam diagram of FIG. 19 and these positions have already been described above in connection with the description of the beginning of the operation.

After twenty messages have been received, switch 229 which is operated by the odometer cam 225 will be shifted from its B position to its C position. In shifting from its B position, the circuit to the power supply is disconnected so that the apparatus can no longer function automatically and the indicator light 68, indicating that the message reel is full, is energized. Since the power supply has been disconnected and the apparatus can no longer function automatically, the telephone will respond to incoming calls simply by continually ringing as though there were no answering device.

MANUAL FUNCTIONS

The selector knob has, in addition to the alert position between 351° and 357°, four manual positions at 159°, 183°, 207°, and 231°, respectively. A detent engageable with cam 11 positions the selector knob in any selected one of those four positions. When the selector knob is rotated to any of the manual positions, the one-way clutch 140 will carry the timer motor shaft 131 with it so that the timer motor cams 1–10 are also brought to that angular position. In three of the four manual positions, the timer motor 82 cannot operate since the contact of cam 15 is held to its neutral or off position. In the fourth position, the timer motor is permitted to operate for it is here that the timer motor is used as a convenient method of timing the period during which the answer motor is operated to dictate a new answer on the answer tape as will be described below.

In the off position at 159°, no automatic functions can take place for the timer motor is completely disconnected through the opening of the contact on the cam 15. There is no notch 72 in the disk 71 corresponding to this position and it is therefore impossible to withdraw the selector knob 60 when it has been rotated to the "off" position.

The next manual position at 183° is referred to as the fast forward position. This position is used when only a few messages have been dictated on the message tape and the operator wishes to return the message tape to its start position so that he can listen to the first message. When in this position, the message tape motor will be connected to the 6 volt supply which will drive the tape motor at approximately five times its normal operating speed. When in this position, it will be seen from the cam diagram of FIG. 19 that the tape motor cam 3 has its contact shifted to the C position to connect the message motor to the power supply. Similarly, in the selector knob cam set, the contact of cam 13 has been shifted to the B position in which the message motor is connected to the 6 volt supply. When the selector knob is shifted to the fast forward position, nothing happens until the selector knob is pulled out to close the switch 122 from the 110 volt AC supply. As soon as the manual selector knob is pulled out closing switch 122, the message motor 183 is driven at its high speed until the odometer indicates that the message tape has been returned to the first recorded message. At that point it automatically turns off through the operation of odometer switch 228.

The next position at 207° is a playback position. When shifted to that position, the movable contact of cam 13 is shifted to the C position in which the tape motors 183 and 256 are operated from the 1.1 volt supply which is for normal operation. The contact of cam 3 is shifted to the C position to connect the message motor 183 to the power supply. The magnetic head cam 4 shifts its contact to B position to connect the message head 194 into the circuit. Amplifier cam 10 is shifted to the C position to connect the message head to the input 263 of the amplifier 262. Cam 6 shifts its contact to the C position to connect the speaker 93 to the output line 265 of the amplifier through the voltage divider 272. Thus, the apparatus is set to play back the messages. The playback operation is begun when the selector knob is withdrawn to close the switch 122. Since the timer motor 82 does not operate at the playback setting because of the neutral position of the contact on timer motor cam 15, the tape motor cam 3 remains stationary holding its contacts in the C position. Thus, the messages will be continually broadcast through the speaker since the opening and closing of the odometer switch 228 will have no effect on the system.

The fourth manual position is at 231° and is the setting used to dictate and answer on the answer tape. In this position, as in the playback position, the cam 13 has shifted its contact to the C position in which the answer motor can be connected to the 1.1 volt supply so as to be driven at normal speed. Cam 3 shifts its contact to the B position so that the supply is connected to the answer motor 256 rather than the message motor 183. Timer motor cam 1 is in position to operate the timer motor. Magnetic head cam 4 has shifted its contact to the C position to connect the answer head 54 to the circuit and cam 2 has shifted its contact to the C position so that the answer head is connected to the output 264 of the amplifier 262. Cam 10 has its contact shifted to the B position to connect the input 263 of the amplifier 262 to the circuit of the microphone 29. As explained above, when the microphone 29 is lifted out of its position in the casing, it releases switch 30 so as to connect the microphone into the circuit. Further, cam 15 is in the C position to complete the circuit of the timer motor 82.

When the manual selector knob is pulled out to the on position, switch 122 closes and all of the elements are in operative position for recording an answer dictated into the microphone 58. The timer motor 82 will run until the 339° position is attained at which point the tape motor cam 3 will have its contact shifted to the neutral position A, thereby deenergizing the answer motor. The period of time between 231° and 339° is approximately twenty seconds which is sufficient for the recording of a message but is insufficient to run the answer tape completely through its cycle, thereby avoiding any possibility of dictating over the first portion of the answer message recorded on the endless tape.

When the answering device is not in use, the telephone can remain mounted on the answering device as shown in FIG. 3. When not in use, the selector knob will have been rotated to the off position, carrying the telephone cam 83 to a position in which the T-shaped arm 36 is free to rise under the urging of the spring 167. The telephone control button will be depressed when the handpiece 23 is placed in the telephone cradle for the handpiece has sufficient weight to overcome the force of the spring. When the handpiece is raised for normal telephone operation, the spring will raise the T-shaped arm 36, therby opening the telephone circuit for normal operation.

What is claimed is:
1. In telephone answering apparatus having a housing, an answer tape and motor therefor, a message tape and motor therefor, and means including a power supply and electrical circuitry for coupling said tapes to a telephone, a control system comprising,
   a rotatable selector knob,
   a set of selector cams and cam operated contacts connected to said knob,
   a timer motor connected to said power supply,
   a set of control cams and cam operated contacts connected to said timer motor, and
   overrunning clutch means interconnecting said cam sets to permit rotation of said cam sets together upon rotation of said knob and permitting independent rotation of said control cams upon operation of said timer motor,
   said cam contacts providing selection and control of the electrical components of said circuitry.

2. In telephone answering apparatus having an answer tape and motor therefor, a message tape and motor therefor, and means for coupling said tapes to a telephone, a control system comprising,
   a rotatable selector knob,
   a set of selector cams and cam operated contacts connected to said knob,
   electric power means,
   a timer motor connected to said power means,
   a set of control cams and cam operated contacts connected to said timer motor, and
   overrunning clutch means interconnecting said cam sets to permit rotation of said cam sets together upon rotation of said knob and permitting independent rotation of said control cams upon operation of said timer motor.

3. A telephone answering apparatus according to claim 1 in which said selector knob is axially movable and
   a main switch for controlling all operating functions, said main switch means being operably associated with said selector knob for operation upon axial movement of said selector knob.

4. A telephone answering apparatus according to claim 3 further comprising a disk on said selector knob, notches in said disk circumferentially spaced with respect to each other, detent means fixed with respect to said housing and cooperating with said notches to permit axial movement of said selector knob when its angular position corresponds to a selected function, said detent means blocking rotation of said selector knob when said knob is withdrawn and the apparatus is switched on.

5. Apparatus according to claim 1 further comprising a one-way clutch connecting said timer motor to said control cams to permit said cams to be rotated by said selector knob without rotating said timer motor.

6. Apparatus according to claim 1 further comprising a plurality of indicator lights, each associated with a particular condition of operation of the apparatus, said selector cams having contacts in circuit with said indicator lights and adapted to energize selected indicator lights depending upon the angular position of said selector knob.

7. Apparatus according to claim 1 further comprising an automtaic signal light, contacts in circuit with said signal light and operable by one of said control cams only when said control cam is in a position corresponding to the beginning of a cycle of operation.

8. Apparatus according to claim 1 in which said electrical circuitry includes at least one switch for opening the circuit to said answer tape motor and means on said answer tape for effecting the opening of said switch.

9. Apparatus according to claim 8 further comprising a photoconductor in series with said timer motor, a photolight mounted adjacent said photoconductor, said answer tape being interposed between said photolight and photoconductor, said answer tape having a translucent section permitting said photoconductor to be illuminated when said translucent section passes between said photoconductor and said photolight.

10. Apparatus according to claim 8 in which said one switch comprises a cam contact operable by one of said control cams.

11. Apparatus according to claim 9 further comprising a second photolight mounted adjacent said photoconductor, electrical means sensitive to the ringing of a telephone to energize said second photolight.

12. Apparatus according to claim 1 further comprising a photoconductor in series with said timer motor, a photolight adjacent said photoconductor, and electrical means for energizing said photolight upon ringing of a telephone.

13. Apparatus according to claim 1 further comprising means connecting said power supply to said message motor and operable upon rotation of said control cams to a preselected angular position and means independent of the position of said control cams for opening the circuit to said message motor.

14. Apparatus according to claim 1 in which said cam sets and contacts provide automatic operation of said apparatus over a first portion of a revolution of the cam sets and provide for selected manual functions over the second portion of a revolution of the cam sets.

15. Apparatus according to claim 1 further comprising a rod pivoted in said housing for lifting a telephone handpiece as the operation of the apparatus is initiated, and a cam fixed to said timer motor and operably connected to said rod to effect the pivoting of said rod upon rotation of said timer motor.

References Cited
UNITED STATES PATENTS

| | | | |
|---|---|---|---|
| 2,580,287 | 12/1951 | Duvall | 200—38 X |
| 2,698,877 | 1/1955 | Abbott | 179—6 |
| 3,033,054 | 5/1962 | Woolley | 200—27 X |
| 3,230,312 | 1/1966 | Catto et al. | 179—6 |

STANLEY M. URYNOWICZ, JR., Primary Examiner

RAYMOND F. CARDILLO, JR., Assistant Examiner